Oct. 10, 1967     O. G. LELLEP     3,345,873
ROTARY KILN TEMPERATURE MEASUREMENT
Filed May 23, 1965
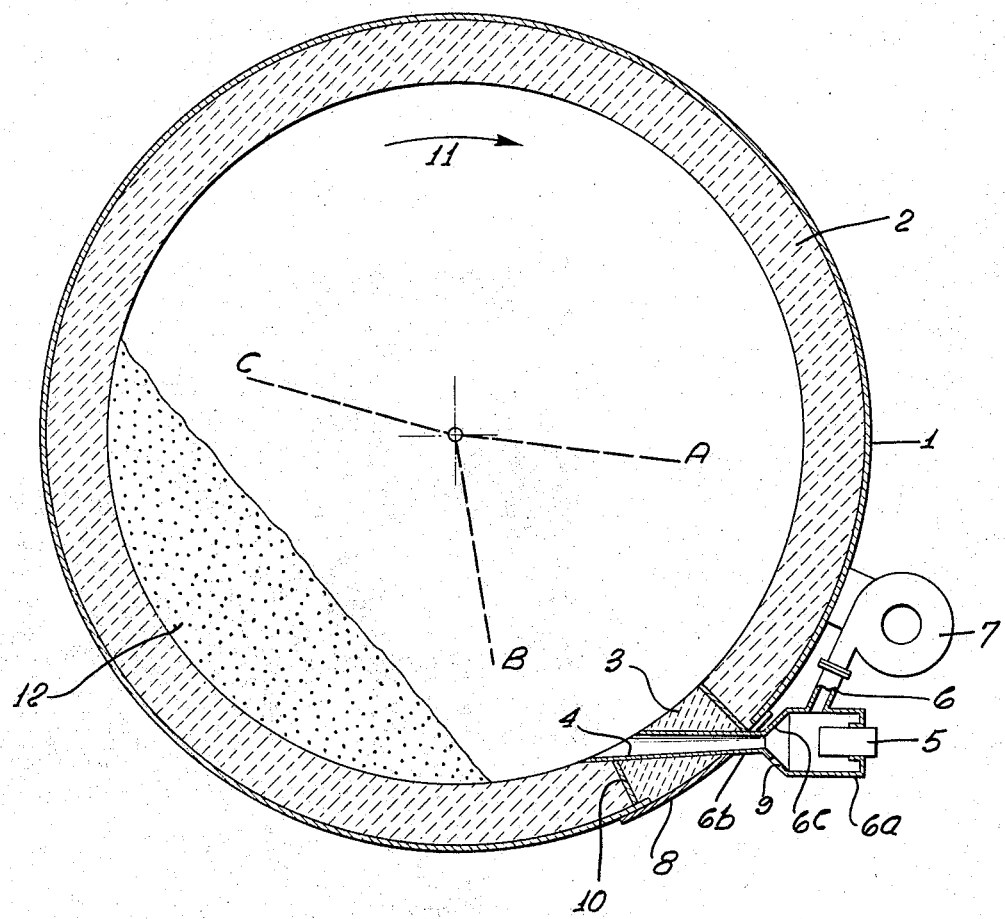
INVENTOR.
OTTO G. LELLEP
BY White & Haefliger
ATTORNEYS.

United States Patent Office 3,345,873
Patented Oct. 10, 1967

3,345,873
ROTARY KILN TEMPERATURE MEASUREMENT
Otto G. Lellep, 3990 4th St., Riverside, Calif. 92501
Filed Mar. 23, 1965, Ser. No. 442,128
Claims priority, application Germany, June 5, 1964,
P 34,424
14 Claims. (Cl. 73—351)

ABSTRACT OF THE DISCLOSURE

A radiation pyrometer mounted on the shell of a rotary kiln, for measuring temperatures inside the kiln by reception of kiln interior radiation through a passage in the kiln wall, air being blown through the passage to maintain it free of the material in the kiln.

The invention refers to a system and device to measure the temperature inside a rotating rotary kiln by means of having at least one pyrometer mounted on the kiln shell.

It is known that the temperatures which are present in the two ends of a rotary kiln are measured, and the signals which are generated by measuring devices, are used in guiding the operation of the rotary kiln. Generally a thermoelectric pyrometer (thermocouple) is used at the feed end of the rotary kiln, whereas at the discharge end of the rotary kiln, normally a radiation pyrometer is essential due to the elevated temperatures.

The development of rotary kilns has given rise to such dimensions, mainly length of kiln, that simple temperature measurements on both ends of the rotary kiln are not sufficient for guiding or controlling the operation of such rotary kilns. Therefore it has been tried to measure the temperature inside a rotary kiln over the total length, and to use these temperatures for the control of the rotary kiln. In practice, an exact measurement of the temperature inside a rotary kiln has been proven to be extremely difficult when the kiln is operating.

Commonly, thermoelectric pyrometers (thermocouples) have been used which were fastened to the kiln shell, and which rotate with the kiln. An unprotected thermoelectric pyrometer (thermocouple) which extends through the kiln shell inside the rotary kiln may be destroyed mechanically in a short time by the moving raw material or be corroded by the hot gases from the flame. It is therefore necessary to protect such thermoelectric pyrometer which extends inside the rotary kiln by a protective heavy shield, e.g., a thick wall piece of pipe. In doing this, many disadvantages occur. The protective shield between the thermocouple and the raw material increases the time lag of temperature measurement, and produces an erratic temperature reading. Practical experiences have proved that the temperature measured by the above mentioned method showed errors of several hundred degrees, based on the through material temperature, and that the time lag very often increased to a few minutes.

The present invention is based on the premise that disadvantages of the known systems for temperature measurement are to be eliminated, and that a new system in accordance with the present invention will provide high accuracy and a very low time lag.

This problem is resolved in accordance with the invention by providing a sight hole through the kiln shell in the direction of the kiln interior as will appear, which sight hole serves as radiation-channel for an optical pyrometer which is mounted on the outside of the kiln shell, and through which an air stream flows into the inside of the rotary kiln.

The air stream keeps the sight hole, which serves as radiation channel for the pyrometer, free from dust and raw material particles. The use of such an air stream directed towards the inside of a rotary kiln makes it possible to use open space, which is only gas filled, for the pyrometer as a measurement channel. The use of an open sight channel makes it possible to use radiation or optical pyrometers at practically any place on the kiln shell, as they are positively protected against any mechnaical damage from the raw material inside the rotary kiln, in that the air stream prevents the raw material from leaving the kiln and at the same time keeps the sight hole open so the pyrometer can measure very exactly the temperature inside the rotary kiln.

The force and magnitude of air stream passing through the sight hole will be matched to the individual condition and application, especially to the size of sight hole, and to the materials processed inside the rotary kiln. It is advisable to select an air stream not greater than necessary to insure that no particles of the processed material will reach the pyrometer in any angle position during one rotation even when the pyrometer is directly below the processed material.

The size of the sight hole may depend first of all, at least in part, on the radiation or optical pyrometer to be used. That size should be made as small as possible to insure that the air requirements are as low as possible.

To insure a workable system in accordance with this invention a blower which can produce the correct quantity and the correct pressure of air is mounted on the outside of the rotary kiln shell, and this blower is connected to the sight hole through ductwork in which the pyrometer is mounted. In case several pyrometers are mounted on the length of the kiln it is advisable to use one blower big enough to supply air for all sight holes.

It is possible that during the actual operation, the sight hole which serves as the radiation channel may be covered for a short time by a bigger piece of processed material. Therefore an air by-pass, which may be in the form of a hole which has a smaller diameter than the sight hole, can be provided in the duct work connecting the blower with the sight hole, and which could be eventually closed by providing a valve for it.

To achieve an exact measurement of the surface temperature of the processed material inside the rotary kiln and to use such measurement for the control of the rotary kiln it is necessary or contemplated in accordance with this invention to install the sigh hole at an angle to the radius of the rotary kiln. This provides for the shortest possible distance between the surface of the material to be measured and the pyrometer. For other purposes the sight hole could also be in a straight radial direction.

It is further desired when the sight hole be so constructed that it could be exchanged from the outside as part of the carrying mechanism for the pyrometer, and of the rotary kiln brick work. Such system makes it possible to exchange this part of the rotary kiln brick work and to insert a new or different sight hole device, and/or a new or different pyrometer. Furthermore the sight hole could be closed completely by this method when for any reason the temperature measurement device is not wanted.

To make the sight hole as small as possible without restricting the angle of view of the optical pyrometer it is necessary or contemplated in accordance with this invention to reduce the opening towards the point where the optical pyrometer is located.

Furthermore the optical pyrometer may be protected against overheating by well known methods. As an example it is possible to install a protective shield which closes automatically when the temperature reaches a certain point, or to protect the pyrometer an exchangeable piece of high heat resisting glass could be installed.

As for process control this invention may be used to feed the output from the pyrometer into automatic regulating and control devices.

In doing this it is especially advantageous for the output from the pyrometer in the course of one rotation (revolution) of the rotary kiln to be fed to three different groups of regulating and control devices, where the first group is connected when the pyrometer looks at the surface of the material being processed inside the rotary kiln, the second group receives the signal when the pyrometer passes directly under the material being processed inside the rotary kiln, and the third group receives the signal when the kiln gases and the opposite side of brickwall of the rotary kiln are within the line of view of the pyrometer.

In case a simple regulating and control device system is used instead of the before mentioned three groups of regulating and control devices, it is advisable to connect such simple regulating and control device system to the pyrometer when it passes below the layer of material in the kiln and the pyrometer is sighted into the material above it looks at the surface of the processed material inside the rotary kiln.

In cases where several optical pyrometers are installed longitudinally of a rotary kiln, the transmitted signals from these pyrometers can be used in combined groups or in relation to each other for the regulation and controlling of the operation of the rotary kiln. In reference to these measured temperatures it is possible to change the shape or form of the flame structure in a rotary kiln. At a constant rate of fuel flow the flame could be shortened and widened by a tangential increase of primary air flow, or by a different valve setting, which then would increase the heat release in the hot zone of a rotary kiln. It is understood that also other values could be changed such as the rate of fuel flow, the rate of material feed, the rate of primary air, the speed of rotation of the kiln, etc. always based on the transmitted temperature signals.

For the burning or sintering of cement at least one pyrometer should be located at the end of calcining zone. A regulating system based on such temperature measurement has the advantage that the total mass of the material to be processed will reach the desired temperature when it enters the adjoining clinkering zone. The present method of temperature measurement through the discharge end of the kiln does not guarantee this as the time interval between when the temperature is measured in the clinkering zone until the time that the material leaves the kiln, is too short. This invention makes it possible to locate the point of temperature measurement at a place on the rotary kiln which is far enough from the discharge end so that the measured signal can be used to its full advantage for regulating.

The accompanying drawing shows an example for an installation of the invention. The drawing shows in schematic form a transverse section through a rotary kiln with which the measuring assemblage is associated.

The illustrated rotary kiln has on the inside of its steel shell 1 a refractory lining 2, which has one of several exchangeable pieces 3, preferably of suitable ceramic material. In section 3 of the refractory lining the sight hole 4 is installed which serves as radiation channel for the radiation pyrometer 5 which is mounted on the outside of the kiln shell.

This pyrometer 5 sits in an enlarged section 6a of the duct work 6 which connects to a blower 7 and also to the sight hole 4. The blower 7 is driven by an electric motor, not shown, which is also mounted on the kiln shell 1, and receives electric power from slip rings, not shown.

The duct work 6 has a tubing 6b and is connected to a steel plate 8, which covers the exchangeable piece or pieces 3 of the refractory lining 2. Between the enlarged section 6a and the tubing 6b of the duct work 6 is a conical part 6c in which an air by-pass hole 9 is located.

The exchangeable piece or pieces 3 of the refractory lining 2 will be enclosed on its side by a heat resisting steel casing 10.

When the kiln is rotating in the direction of the arrow 11 the pyrometer 5 also rotating with the kiln will see the material inside the kiln through the sight hole 4 from a different angle depending on the rotated position of the kiln. When the sight hole 4 is in an angular view between the lines A and B the pyrometer 5 will see the surface of the material 12 which is processed inside the kiln, and therefore measures its surface temperature. The air stream supplied by blower 7 passing through the ductwork 6 into the inside of the kiln keeps the sight hole 4 free from processed material, dust, and combustion gases, and at the same time protects the pyrometer 5 from being overheated.

In an angular view between the lines B and C the sight hole 4 and the pyrometer 5 are moving under the processed material 12. A migration of processed material into the sight hole 4 is prevented by the air stream and its velocity, which is supplied by blower 7 through the sight hole 4 in the direction of the inside of the rotary kiln. In this position the pyrometer 5 measures essentially the mass temperature of the processed material. In an angular view between lines C and A the kiln gases and the inside surface of the kiln wall are seen by pyrometer 5.

In case the sight hole 4 should be temporarily closed during the operation by a bigger piece of the processed material, the by-pass hole 9 allows the air flow from blower 7 to cool the pyrometer 5 thus preventing overheating and coating.

I claim:

1. The combination comprising a rotary kiln through which a gravitating material passes while being heated to elevated temperature, means forming a passage through the wall of the kiln, the pasasge located to periodically sweep directly under said material to be exposed to penetration by the material, a pyrometer mounted to the outside of the kiln for rotation therewith and aligned with said passage to receive radiation from the kiln interior through the passage, and means operating to project an air stream through said passage into the kiln and with sufficient air velocity in said passage to displace toward the kiln interior the material tending to enter said passage as the passage sweeps under the material whereby the passage is maintained substantially free of said material throughout passage rotation.

2. The combination of claim 1, in which said last named means comprises a blower carried by the kiln and operating to displace air through said passage.

3. The combination of claim 2, in which said last named means includes a duct at the exterior of the kiln to pass blower displaced air to said passage, the pyrometer being in direct communication with the duct interior and air displaced therein.

4. The combination of claim 3, including also means for by-passing to the atmosphere the blower-displaced air in advance of said passage.

5. The combination of claim 1, in which said passage extends angularly relative to a radial axis of the kiln, and closer to tangentially than radially with respect to the kiln wall inner face.

6. The combination of claim 1, in which the kiln wall includes an outer shell and refractory lining, said passage extending through a sectional and exchangeable portion of the lining and shell.

7. The combination of claim 1, in which said kiln is a cement burning kiln.

8. The combination comprising a rotary kiln through which a gravitating material passes while being heated to elevated temperature, a duct structure mounted to the outside of the kiln for rotation therewith, said structure including a tube extending through the wall of the kiln and forming a straight open passage, the passage located to periodically sweep directly under said material to be exposed to penetration by the material, a pyrometer associated with said structure and aligned with said passage to receive radiation therethrough from the kiln interior, and a blower mounted to the kiln and connected to said duct structure, said blower operating to project an air stream through said passage into the kiln and with sufficient air velocity in said passage to displace toward the kiln interior the material tending to enter said passage as the passage sweeps under the material whereby the passage is maintained substantially free of said material throughout passage rotation.

9. The combination of claim 8, in which said tube and passage progressively enlarge inwardly of the kiln.

10. The combination of claim 8, in which said pyrometer is within the duct structure in direct communication with the path of air being displaced by the blower to said passage.

11. The combination of claim 10, including means for discharging blower-displaced air from the duct structure to the atmosphere in advance of said passage.

12. The combination of claim 8, in which the kiln wall includes an outer shell and refractory lining, said tube extending through a sectional portion of the lining.

13. The combination of claim 12, in which said tube extends angularly relative to a radial axis of the kiln, and closer to tangentially than radially with respect to the kiln wall inner face.

14. The combination of claim 12, including also a metallic casing containing said sectional portion of the lining and received within the kiln wall, and a plate overlapping the kiln surface beyond said casing and through which said tube extends.

References Cited

UNITED STATES PATENTS

| | | | |
|---|---|---|---|
| 1,667,355 | 4/1928 | Norton | 236—15 |
| 1,995,723 | 3/1935 | Van Denburg | 236—15 |
| 2,275,265 | 3/1942 | Mead | 236—15 |
| 2,448,199 | 8/1948 | Vollrath | 236—15 |
| 3,273,874 | 9/1966 | Hucke | 263—33 |

FOREIGN PATENTS 127,571  11/1928  Switzerland.

LOUIS R. PRINCE, *Primary Examiner.*

F. SHOON, *Assistant Examiner.*